United States Patent [19]

Nijjar et al.

[11] Patent Number: 4,762,170
[45] Date of Patent: Aug. 9, 1988

[54] AUXILIARY POWER SYSTEM FOR TRUCKS AND OTHER HEAVY DUTY VEHICLES

[75] Inventors: Parmjit S. Nijjar, Newark; Joseph J. Neff, Fremont, both of Calif.

[73] Assignee: Paccar Inc., Newark, Calif.

[21] Appl. No.: 122,247

[22] Filed: Nov. 16, 1987

[51] Int. Cl.[4] .................. F02N 17/06; B60H 1/22; B60H 1/03

[52] U.S. Cl. .................. 165/43; 123/142.5 R; 62/236; 62/510; 237/12.3 B; 237/12.3 C; 237/12.1

[58] Field of Search .......... 123/142.5 R; 165/42, 165/43; 237/12.3 B, 12.3 C, 12.1; 62/236, 510

[56] References Cited

U.S. PATENT DOCUMENTS

| | | | |
|---|---|---|---|
| 3,866,433 | 2/1975 | Krug | 62/236 |
| 3,984,224 | 10/1976 | Dawkins | 62/510 |
| 4,448,157 | 5/1984 | Eckstein et al. | 123/142.5 R |
| 4,531,379 | 7/1985 | Diefenthaler, Jr. | 237/12.3 B |
| 4,611,466 | 9/1986 | Keedy | 237/12.3 B |
| 4,682,649 | 7/1987 | Greer | 165/43 |

*Primary Examiner*—Albert W. Davis, Jr.

*Attorney, Agent, or Firm*—Flehr, Hohbach, Test, Albritton & Herbert

[57] ABSTRACT

An auxiliary power system for a truck or other heavy duty vehicle. A secondary engine which is smaller than the vehicle's main engine is used to generate heat and electrical power, and to drive an auxiliary air conditioning system. The coolant systems of the two engines are interconnected so that when the main engine is off and the secondary engine is on, waste heat from the secondary engine is transferred by coolant flowing through the water jacket of the secondary engine to the main engine and also to heater cores in the truck's cab and sleeper. An electrical generator driven by the secondary engine provides electrical energy. The auxiliary air conditioning system includes an auxiliary compressor and an auxiliary condenser, and connections for efficiently interconnecting the auxiliary air conditioning system with the truck's primary air conditioning system. The auxiliary power system permits the use of a small and efficient engine to keep the truck's main engine and cab warm and to run a variety of other accessories without having to run the truck's main engine.

4 Claims, 2 Drawing Sheets

ELECTRICAL CONTROLS

AUXILIARY POWER SYSTEM FOR TRUCKS AND OTHER HEAVY DUTY VEHICLES

The present invention relates generally to a auxiliary power system for use in trucks and other heavy duty vehicles, and particularly to a cogeneration system which can provide heat to a primary engine for facilitating restarting the primary engine in cold weather, as well as auxiliary electrical power and air conditioning.

BACKGROUND OF THE INVENTION

The problem addressed by the present invention is that, during the winter, cross country truckers traditionally idle their engines during overnight rest stops to assure cold weather restart and to provide heat in the cab. In particular, to enable cold weather restart it is important to keep the truck's motor oil and diesel fuel warm. As is well known, motor oil provides proper engine lubrication only within a limited temperature range, and diesel fuel typically begins to wax at temperatures below 40 degrees Fahrenheit and becomes a virtually unusable gel at temperatures below 20 degrees Fahrenheit.

Idling the main truck engine overnight is one way to keep the truck's motor oil and diesel fuel warm and to thereby assure cold weather restart. This use of the main truck engine, however, is very inefficient. Typical truck engines, such as 300 to 500 BHP Diesel engines, are very inefficient when operated at 600 to 900 RPM at only 10 to 20 BHP—i.e., the power level needed to idle the engine and to drive the truck's electrical generator, cab heater or air conditioner, and other cab accessories.

As provided by the present invention, one solution to the problem of maintaining a habitable environment in a truck cab overnight and keeping the engine warm so that it can be restarted after a cold winter's night, is to use a small cogeneration system which can perform these functions more efficiently than the truck's main engine. In particular, the cogeneration system includes a supplemental engine which supplies heat to certain engine components and also supplies power to a selected set of cab accessories which are normally powered by the main engine. Furthermore, the supplemental engine of the present invention can and preferably does use the same fuel supply as is used for the main truck engine.

The prior art includes a number of supplementary engine systems, often called pony engines, for use in trucks. See, for example, U.S. Pat. Nos. 4,682,649 (Greer, 1987) and 4,448,157 (Eckstein et al., 1984). However, the prior art pony engines have, generally, been too complicated, expensive and insufficiently energy efficient to achieve significant commercial success.

The present invention provides improved energy efficiency and reduced complexity by interconnecting the fluid coolant systems of the truck's primary and auxiliary engines, and using this interconnection as the sole mechanism for providing heat to the primary engine and the truck's cab and sleeper heaters.

The present invention also provides improved auxiliary air conditioning by providing an auxiliary condenser as well as an auxiliary compressor, and electrical controls for selectively enabling either the auxiliary or the primary compressor. The electrical control allow the auxiliary engine to drive the auxiliary compressor even when the primary engine is running, thereby allowing the air conditioning load to be removed from the primary engine.

It is therefore a primary object of the present invention to provide an improved auxiliary power system for trucks and other heavy duty vehicles.

Another object of the present invention is to provide a truck cogeneration system that uses waste heat from an auxiliary engine to heat the truck's main engine, cab and sleeper compartment.

SUMMARY OF THE INVENTION

In summary, the present invention is an auxiliary power system for a truck or other heavy duty vehicle. The auxiliary system uses a secondary engine which is smaller than the vehicle's main or primary engine and which is more efficient than the vehicle's main engine at low energy output levels.

The auxiliary engine includes a water jacket which is interconnected with the main engine's coolant system. Coolant fluid flows through the auxiliary engine's water jacket, drawing heat from the auxiliary engine. The coolant then flows through the main engine's water jacket, thereby heating the main engine block. The coolant fluid heated by the auxiliary engine is also used for heating the truck's cab and sleeper compartments when the main engine is not in use. The use of this auxiliary power system permits the use of a small and efficient engine to keep the truck's motor oil, fuel and cab warm and to power a variety of cab accessories without having to run the vehicle's primary engine.

In the preferred embodiment, the auxiliary engine also drives an auxiliary alternator which charges the truck's batteries and provides 110 volt a.c. power to the truck's sleeper compartment.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
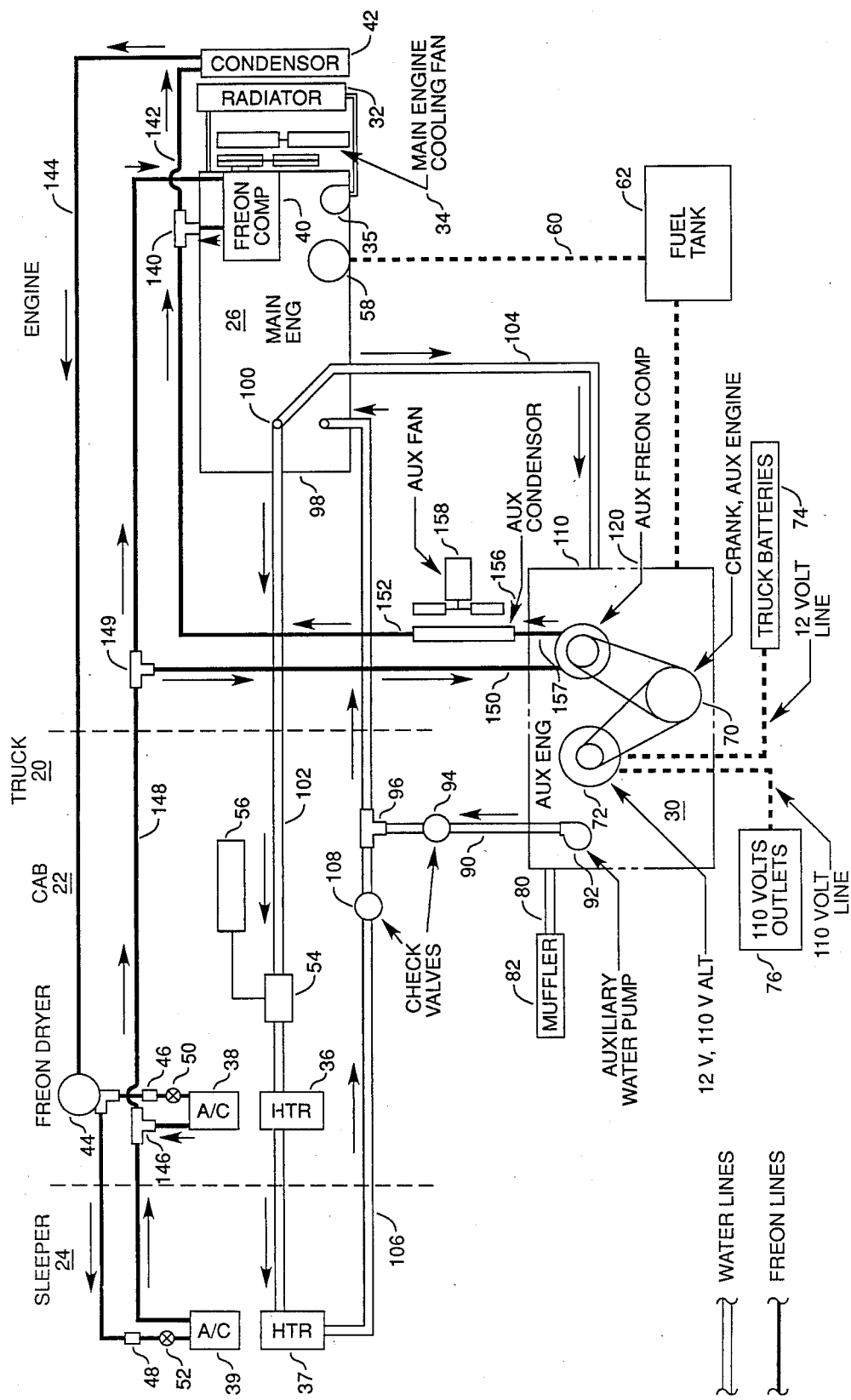
FIG. 1 is a schematic drawing of a cogeneration system in accordance with the invention.

FIG. 1 shows the primary components of an auxiliary power system for providing heating, air conditioning and electrical power to the cab 22, and sleeper 24 of a truck 20. An auxiliary engine 30 is coupled to the truck's cooling, air conditioning and electrical systems which are also coupled to the truck's main or primary engine 26. This auxiliary engine 30 is substantially smaller than and independent of the main engine 26, and is used to provide power to selected preexisting accessories when the main engine 26 is not in use. In the preferred embodiment the auxiliary engine is a diesel 10 BHP engine such as the Model ZB600 engine made by Kubota. More generally, auxiliary engines will generally be diesel fuel engines with capacities between 5 and 25 BHP.

For the purposes of this specification, the term "truck" is defined to include any heavy duty vehicle.

Primary Engine And Associated Equipment

In the preferred embodiment, before the addition of the auxiliary power system, the truck is already equipped with the following components. As is standard, the truck's engine cooling system includes a radiator 32 in fluid connection with the jacket of the main engine 26, and a cooling fan 34. The main engine includes a control valve (not shown) that enables the flow of coolant fluid from the main engine jacket through the radiator 32 only when a thermostat indicates that the main engine's temperature exceeds a specified temperature. A water pump 35 provides the line pressure required to ensure adequate circulation of coolant fluid through the main engine's jacket and the radiator 32.

The cab 22 and the sleeper 24 in the truck each have heating units (i.e., heater cores) 36 and 37, and air conditioning units 38 and 39. A refrigerant (i.e., freon 12, also known as R12) compressor 40 driven by the main engine 26 provides high pressure freon to the air conditioning units 38 and 39. Compressed freon flows from this compressor 40 to a condenser 42, and then to a receiver 44. In the preferred embodiment the receiver 44 is a freon dryer having a T-connection at its outlet so that freon is supplied by the receiver 44 to both the cab and sleepers air condition units 38 and 39.

Solenoid valves 46 and 48 are used to control the flow of freon into the air conditioning units 38 and 39 in the cab 22 and sleeper 24, respectively. Similarly, there are separate expansion valves 50 and 52 at the inlets to the cab and sleeper air conditioning units. Standard, independent controls are used to open the solenoid valves 46 and 48 in accordance with selection made by the system's user.

As is standard in trucks and other vehicles, a flow control valve 54 controls the flow of heated coolant fluid through the heater cores 36 and 37 in the cab and sleeper. The amount of flow through valve 54 is controlled by a heat level selection lever 56 in the cab 22.

In the preferred embodiment there is also an electrically powered fuel heater 58 surrounding the main engine's fuel filter (not shown) for liquifying gelled diesel fuel in cold weather. For trucks used in extremely cold climates a second electrically powered fuel heater is added to the fuel filter for the auxiliary engine 30. In an alternate embodiment, a fuel heater could be provided for directly heating the fuel tank 62.

It should be noted that a single cooling fan 34 is used to cool both the main engine radiator 32 and the condenser 42. This fan 34 is controlled using a temperature sensor on the output line of the radiator 32, a pressure sensor on the outlet of the freon dryer 44, and an manual override switch in the cab 22. The fan 32 is automatically turned on under any one of three conditions: (1) if the main engine is on and the temperature of the main engine's coolant fluid exceeds a specified temperature, (2) if the pressure in the on the outlet of the freon dryer 44 exceeds a specified pressure level, or (3) if a manual override switch is closed (i.e., turned on) by the driver in the truck's cab 22.

Auxiliary System

As discussed above, the main purpose of the auxiliary engine 30 is to allow the use of a smaller and more efficient engine to heat selected system components and to drive selected accessories when the main engine is not in use. These selected components and accessories typically include electrical accessories such as lights and fans, components which use thermal energy such as the cab and sleeper heaters 36 and 37, and accessories which use mechanical power such as an auxiliary freon compressor 66.

The auxiliary engine 30 also acts as a cogeneration system in that waste heat from the auxiliary engine 30 is used to perform useful work—i.e., providing heat to the main engine 26, the cab 22 and the sleeper 24. Furthermore, both the main and secondary engines share the same fuel supply 62.

In the preferred embodiment, the auxiliary power system 30 is mounted in a modified version of the truck's tool box, which is mounted on the truck's frame rail.

Electrical Generator

The auxiliary engine's crank shaft 70 drives an auxiliary electrical generator 72 (i.e., an alternator). In the preferred embodiment, the alternator 72 (e.g., the model 4.5KVA MARK3 alternator made by US Energy) generates both 12 volts d.c., and 110 volts a.c. The 12 volt d.c. output from the generator recharges the truck's 12 volt battery 74, and the 110 volt a.c. output is coupled to one or more outlets 76 in the sleeper 24 so that standard 110 volt accessories can be used in the sleeper.

Coolant Fluid System

The auxiliary engine 30 uses the same coolant fluid as is used by the main engine 26. Thus the same coolant fluid passes through the jackets of both engines and, when the auxiliary engine is used, heat from the auxiliary engine 30 is transferred to main engine 26, thereby maintaining the main engine block at a temperature which facilitates easy starting. Conversely, coolant will flow through the auxiliary engine's jacket when the main engine 26 is running but the auxiliary engine 30 is off.

It should be noted that in the preferred embodiment the oil in the main engine's crankcase is heated (so as to maintain a proper oil viscosity for starting the main engine 26) solely by the flow of hot coolant fluid through the main engine's jacket.

The truck's coolant plumbing system, and the direction of flow of coolant through the plumbing system, is identified by solid arrows drawn next to the lines which carry coolant.

In the preferred embodiment, a hot exhaust heat exchanger is not used to heat the truck's coolant fluid because such heat exchangers significantly increase the cost, complexity and maintenance costs of the auxiliary power system. All cogeneration heat is provided directly by coolant fluid flowing through the auxiliary engine's jacket. Hot exhaust from the auxiliary engine is expelled through exhaust line 80 and muffler 82, which are separate from the exhaust line and muffler for the main engine.

The primary flow path of coolant fluid, when the auxiliary engine 30 is turned on, is as follows. Coolant fluid in the auxiliary engine's jacket is pumped into line 90 by an auxiliary water pump 92 that operates only when the auxiliary engine is on. The auxiliary water pump 92 provides the line pressure required to keep the coolant flowing through the entire coolant plumbing system when the main engine is off and only the auxiliary engine is running. Water pump 92 may be built into the auxiliary engine 30 or it may be driven by belt or other mechanical means coupled to the auxiliary engine's drive shaft 70.

From line 90, coolant flows through a one way check valve 94 into a T-valve 96 and then into the water jacket 98 of the main engine 26. Coolant leaves the main engine's water jacket 98 at outlet 100, flowing into plumbing lines 102 and 104. Line 102 directs coolant fluid to the heat cores 36 and 37, and thus coolant flows through this line only to the extent that heating control valve 54 is open. Coolant returning from the heater cores flows through line 106, one way check valve 10 and then through T-valve 96 back to the main engine's water jacket 98.

Coolant fluid line 104 directs coolant exiting the main engine's jacket into the auxiliary engine's water jacket 110. As explained above, the coolant exits the auxiliary engine's water jacket through the auxiliary water pump 92.

Check valves 94 and 108 prevent coolant fluid leaving the auxiliary engine from flowing toward the heater cores 36 and 37 in opposition to the normal flow of coolant through the plumbing system. Furthermore, when the main engine is on and the auxiliary engine is off, these check valves ensure that while coolant flows through the auxiliary engine's water jacket 110 (thereby enabling easy starting of the auxiliary engine in cold weather and also helping to dissipate waste heat generated by the main engine), the auxiliary system does not interfere with the normal flow of coolant through the plumbing system.

As noted above, coolant in the main engine's water jacket 98 will flow through radiator 32 only when a thermostat in the main engine opens a valve between the main engine's water jacket 98 and the radiator 32. This valve will open at the thermostat's set point even if the main engine is off. The inventors have found that even though the radiator cooling fan 34 and the main engine's water pump 35 are not turned on when the main engine is off, the radiator 32 will dissipate enough heat when only the auxiliary engine 30 is running to maintain the coolant fluid at an acceptable temperature.

In an alternate embodiment, excessive heating of the coolant fluid could be further prevented by providing a small, auxiliary radiator between the auxiliary water pump 92 and check valve 94, along with an electric fan for cooling the auxiliary radiator. In yet another alternate embodiment, a safety switch could be provided in the auxiliary engine which would turn off the auxiliary engine in the event that the coolant temperature exceeded a preset limit.

Auxiliary Air Conditioning

The auxiliary engine 30 drives an auxiliary freon compressor 120 so that air conditioning can be provided to the cab and sleeper when the main engine 26 is off. The auxiliary compressor 120 is driven by the auxiliary engine's drive shaft 70. As is standard in many vehicular compressors, the compressor's drive shaft is coupled to the compressor drive belt by a magnetic clutch (not shown) so that the compressor 120 can be turned on and off.

Note that the terms refrigerant and freon are used interchangeably in this specification. As will be understood by those skilled in the art, the freon and associated components used in the preferred embodiment could be replaced with another refrigerant and corresponding components in alternate embodiments of the present invention.

Figure 2:
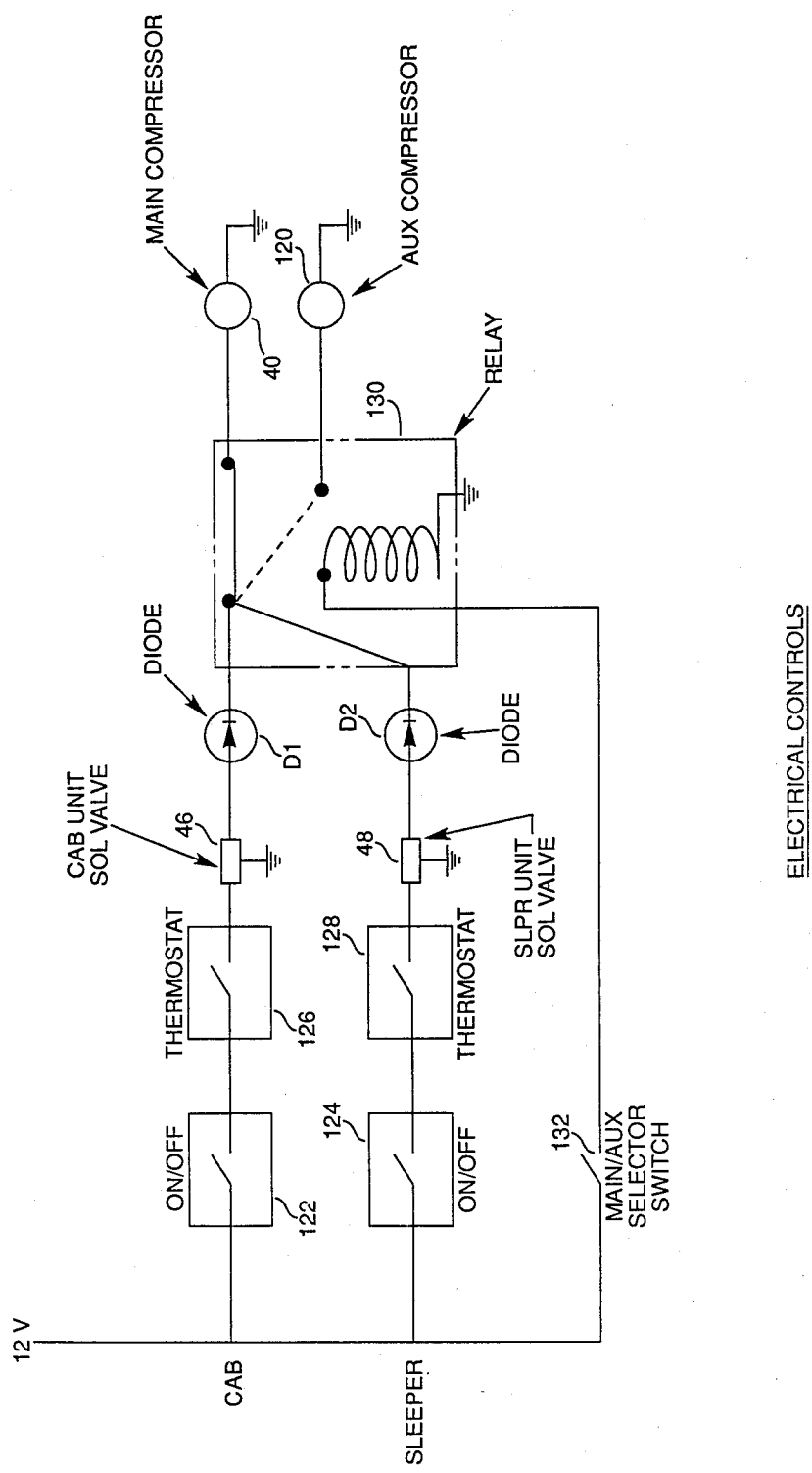
FIG. 2 depicts the electrical controls for the main and auxiliary air conditioning compressors in the preferred embodiment.

The electrical control for the main and auxiliary compressors is shown in FIG. 2. The truck's normal on/off and air conditioning thermostatic switches 122, 124, 126 and 128 and solenoid valves 46 and 48 are retained. However, a relay 130 is added for switching between the main and auxiliary compressors 40 and 120. When the auxiliary engine 30 is on, main/aux switch 132 is closed, thereby enabling the auxiliary compressor 120 to be energized; when the auxiliary engine 30 is off, the switch 132 is opened, enabling the main compressor 40 to be energized.

Note that the diodes D1 and D2 shown in FIG. 2 prevent the corresponding solenoid valves (46 and 48, respectively) from being opened when the corresponding on/off switch (122 or 124) is in the off position.

Referring back to FIG. 1, the flow of refrigerant through the air conditioning system is as follows. When the main engine 26 and its compressor 40 are on and the auxiliary engine 30 and the auxiliary compressor 120 are off, compressed freon leaves compressor 40 and flows into condenser 42 via T-valve 140 and line 142. From the condenser 42, freon flows through refrigerant line 144 into receiver 44. If solenoid valve 46 is open, freon is released through expansion valve 50 into the cab's air conditioning unit 38. From there, the freon returns through T-valve 146, refrigerant line 148 and T-valve 149 to the inlet of the compressor 40.

If solenoid valve 48 is open, freon is released through expansion valve 52 into the sleeper's air conditioning unit 39. From there, the freon returns through T-valve 146 and line 148 to the inlet of the compressor 40.

When the auxiliary engine 30 is on, the main engine's compressor 40 is disabled by switch 132, and thus only the auxiliary compressor 120 can be used for air conditioning. Compressed freon leaving compressor 120 and flows into an auxiliary condenser 156 through line 157. An auxiliary fan 158 is provided for cooling the freon in the auxiliary condenser 156. This fan 158 is automatically turned on if auxiliary compressor 120 is on and the pressure in the the outlet of the freon dryer 44 exceeds a specified pressure level. In an alternate embodiment, the fan 158 is mounted on the shaft of the auxiliary alternator 72 so that the fan 158 will run whenever the auxiliary engine is on.

It should be noted that the use of a roof top condenser would be more expensive than one located closer to the auxiliary freon compressor 120, and that the increasingly prevalent use of aerodynamic air foils has eliminated the room on the truck's roof for a condenser. Also, it is generally impractical to depend on the main condenser 42 for condensing when the main engine is off because the main fan 34 cannot run when the main engine is off and there is usually no room near the main engine's fan 34 for an additional electrically powered fan for cooling the main condenser 42.

From the condenser 156, freon travels through line 152 to T-valve 140, through the main condenser 42 for additional condensing (even though the main engine fan 34 is off when the main engine 26 is off), and then through substantially the same path used when the main compressor 40 is being used. However, the returning freon in line 148 is drawn down line 150 back into the compressor 120.

The freon plumbing system in the present invention is designed so that back flow restriction valves are not needed between the two compressors 40 and 120. While gaseous freon can enter the lines leading to a compressor which is not turned on, these lines are evacuated by the compressor that is on. The outlets of the two compressors need not be protected with back flow restriction valves because refrigerant compressors, such as the ones used in automotive air conditioning systems, already contain a pressure valve at the compressor's outlet which remains closed when there is no pressure on the valve from inside the compressor.

In general, the auxiliary system used in the present invention is substantially more reliable and therefore less expensive to maintain than the prior art auxiliary systems. The auxiliary system's air conditioning derives its improved reliability from (1) the use of simple, well placed connections (the auxiliary equipment interfaces with the other air conditioning equipment solely at T-valves 140 and 149), and (2) the use of an auxiliary condenser 156 with its own fan 158. The auxiliary air conditioning system also makes use of the main condenser 42 in addition to the auxiliary condenser 156, which significantly improves the efficiency of the auxiliary air conditioning system. The use of two condensers is accomplished by an unusual parallel connection design, in which both the auxiliary compressor 120 and the auxiliary condenser 156 are connected in parallel with the primary compressor 40 but in series with the primary condenser 42.

The auxiliary air conditioning system also provides a feature not found in other auxiliary power systems—the ability to run the truck's air conditioner using an auxiliary engine while the primary engine is in operation. Thus, when the truck is heavily loaded and/or going up long steep grades, the air conditioning load can be removed from the main engine without having to forego air condition in the truck's cab.

Another advantage of the present invention is that the flow pattern of the combined coolant systems, and the use of the auxiliary engine's water jacket as the sole heat cogeneration source, provides an integrated coolant plumbing and cogeneration system which is highly reliable.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

For instance, in the preferred embodiment there is no special provision made for heating the fuel tank because the heat generated by running the auxiliary engine 30 has been found to be sufficient to keep the diesel fuel from gelling. However, in an alternate embodiment for colder environments, an electrical heater (such the heater sold under the trademark HOTLINE by Peterbilt Motors Company) is provided for heating the fuel tank 62 to prevent the fuel therein from gelling at low temperatures.

What is claimed is:

1. In a truck or other heavy duty vehicle having a cab, a battery, a main engine having an engine block and a water jacket, a radiator and coolant lines coupling the water jacket of the main engine to the radiator, at least one heating unit and additional coolant lines including an additional outlet coolant line for delivering coolant fluid from the water jacket of the main engine to the heating unit and an additional inlet coolant line for returning coolant fluid from the heating unit to the water jacket of the main engine; an auxiliary power system comprising:

a secondary engine smaller than and independent of said main engine, said secondary engine having a water jacket with an inlet for coolant fluid and a auxiliary water pump for pumping coolant fluid out of said water jacket of said secondary engine; and auxiliary coolant lines including an auxiliary coolant outlet line for routing coolant pumped by said auxiliary water pump into said water jacket of the main engine, and an auxiliary coolant inlet line for routing coolant fluid from the water jacket of the main engine into said water jacket of said secondary engine; said auxiliary coolant outlet line being coupled to the additional coolant inlet line, for returning coolant fluid from the heating unit to the water jacket of the main engine, with one way check valves in said auxiliary coolant outlet line and in the additional coolant inlet line to prevent back flow of coolant fluid into the heating unit and into said secondary engine's water jacket.

whereby the waste heat generated by said secondary engine can be used to heat the main engine and the heating unit.

2. The auxiliary power system set forth in claim 1, wherein the truck or other heavy duty vehicle has an air conditioning system including a primary compressor, a primary condenser, at least one air conditioning unit, and refrigerant lines including a first refrigerant line coupling the primary compressor to the primary condenser, an outlet refrigerant line for delivering refrigerant from the primary condenser to the air conditioning unit and an inlet refrigerant line for returning refrigerant from the air conditioning unit to the primary compressor;

said auxiliary power system further including an auxiliary air conditioning system having: an auxiliary compressor, driven by said secondary engine, having an inlet and an outlet; an auxiliary condenser having an inlet coupled to said outlet of said auxiliary compressor and an outlet; an auxiliary fan for cooling said auxiliary condenser; and auxiliary refrigerant lines for connecting said auxiliary compressor and condenser to the air conditioning system in parallel with the primary compressor, including an auxiliary outlet refrigerant line coupling said auxiliary compressor's outlet to the first refrigerant line coupling the primary compressor to the primary condenser, and an auxiliary refrigerant inlet line coupling said inlet of said auxiliary compressor to the inlet refrigerant line for returning refrigerant from the air conditioning unit to the primary compressor.

3. The auxiliary power system set forth in claim 2, said auxiliary air conditioning system further including electrical control means for enabling the use of said auxiliary compressor and disabling the use of said primary compressor when said auxiliary engine is running;

whereby said auxiliary air conditioning system can be used to provide cold refrigerant to the air conditioning unit even when the main engine is running.

whereby said auxillary air conditioning system can be used to provide cold refrigerant to the air conditioning unit even when the main engine is running.

4. The auxilliary power system set forth in claim 2, furhter including generator means driven by said secondary engine for recharging the battery, and for providing a.c. electrical power to run connnentional a.c. electrical accessories.

* * * * *